UNITED STATES PATENT OFFICE.

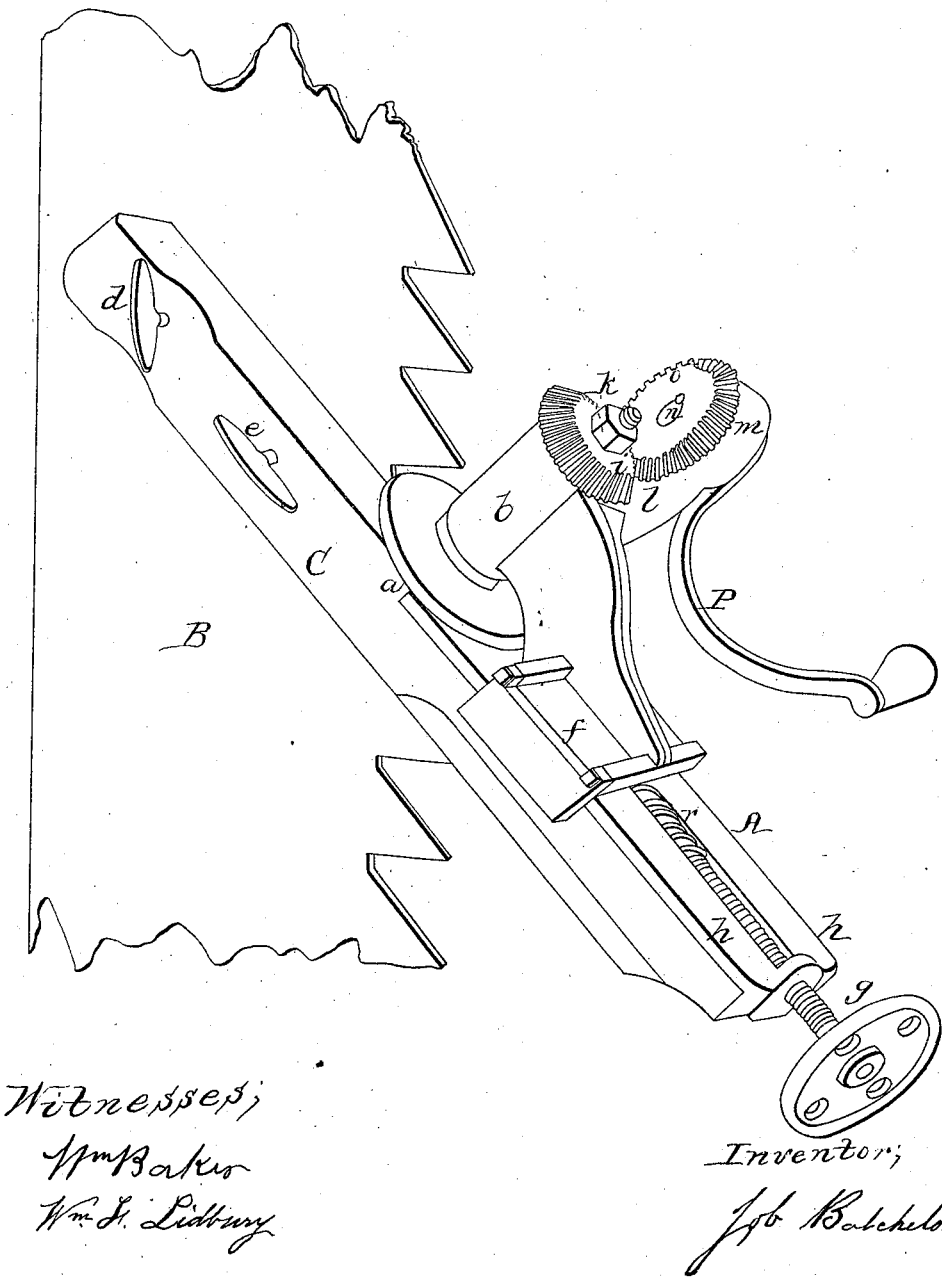
J. Batchelor,
Saw Sharpener.
Nº 19,978. Patented Apr 20, 1858.

JOB BATCHELOR, OF CAMDEN, NEW YORK.

DRESSING-SAW.

Specification of Letters Patent No. 19,978, dated April 20, 1858.

*To all whom it may concern:*

Be it known that I, JOB BATCHELOR, of Camden, in the county of Oneida and State of New York, have invented a new and useful Machine or Instrument for Dressing and Sharpening Sawmill-Saws; and I do hereby declare that the following is a full and exact description thereof, reference being had to the annexed drawing and the letters of reference marked thereon.

The accompanying drawing represents the whole working machine of about one-half the usual working size. It is designed as the drawing shows to be fastened to the saw while in its usual upright position in the mill in order to dress the teeth without removing the saw.

A is the machine and B the saw to be sharpened. The machine being fastened to the saw as when in the act of sharpening occupies an inclined position corresponding to the bevel of the upper side of the saw teeth. The dressing of the teeth is performed by the use of a revolving circular file operating horizontally or transverse to the line of its shaft.

*a* is the file and *b* its shaft stock.

C is the frame or base of the machine. It is divided in front by a longitudinal slot passing up sufficient length to admit the saw. The machine is slipped onto the saw, the latter passing within the slot, as shown on an inclination suited to the slope of the saw teeth, and then fastened by the set screw *d* and *e*.

*f* is a loose carriage moved back and forth by the feeding screw *g* sliding in the ordinary manner of a lathe on the ways H, H. The file shaft stock *b* is cast solid with the carriage *f*, so that the moving carriage *f*, carries the file *a* with it. The stock *b* is hollow and the file shaft passes up through it loosely and has upon its upper end the miter wheel *i*, and the nut *k* as shown.

Attached to the rear of the rim of the shaft stock *b* is the arm *l*, also cast with the shaft stock *b*, on this arm is the counter shaft stock *m* in which turns the short shaft *n*, containing the match miter wheel *o*. The hand crank P takes hold of the opposite end of the short shaft.

The feed screw *g* works in an appropriate seat on the under side of the carriage *f*. The machine being adjusted in such a manner, that the file *a* strikes the point of the tooth to be sharpened properly and is then fastened by the screws *d* and *e*, the file is then revolved by means of the hand crank P, while with the other hand the carriage *f* with the file *a* are set forward as the work may demand by means of the feeding screw *g*. There is a coiled wire spring *r* on the feeding screw shaft in front of the screw, which gives elasticity and steadiness to the pressure of the screw in feeding.

The file *a* which is the principal agent in my mode of sharpening or gumming sawteeth is made of good steel, and is about three and a half inches in diameter, and one-fourth of an inch thick. It is cut into a file surface on the under side, on the edge and for a short space back from the edge on the upper side. It is capable of being hardened in the same manner as other files, and presenting a large surface of any desired diameter, may be recut when desired and made to last a long time. The disk of which it is formed working edgewise forward, it may be made large and still capable of reaching the root of the tooth. Both the base C and the carriage *f*, are made of cast iron, and the whole machine is got up at a very moderate expense.

What I claim as new and desire to secure by Letters Patent, is—

The horizontal disk file *a*, for the purposes described and its connection and combination with the movable parts of the machine by which the same is operated as herein described the whole being combined arranged and operating substantially in the manner herein set forth.

JOB BATCHELOR.

Witnesses:
WM. BAKER,
WM. F. LIDBURY.